US006703970B2

(12) United States Patent
Gayrard et al.

(10) Patent No.: US 6,703,970 B2
(45) Date of Patent: Mar. 9, 2004

(54) BEAM FORMING NETWORK, A SPACECRAFT, AN ASSOCIATED SYSTEM AND A BEAM FORMING METHOD

(75) Inventors: Jean-Didier Gayrard, Toulouse (FR); Laurent Martin, Fontenilles (FR); Gérard Caille, Tournefeuille (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/208,781

(22) Filed: Aug. 1, 2002

(65) Prior Publication Data

US 2003/0043068 A1 Mar. 6, 2003

(30) Foreign Application Priority Data

Sep. 6, 2001 (FR) .......................................... 01 11532

(51) Int. Cl.[7] ............................................... H04B 7/185

(52) U.S. Cl. ....................... 342/354; 342/372; 342/378; 342/380; 342/383; 343/DIG. 2; 343/881

(58) Field of Search ................................ 342/354, 372, 342/378, 380, 383; 343/DIG. 2, 881

(56) References Cited

U.S. PATENT DOCUMENTS 5,175,556 A 12/1992 Berkowitz
5,430,451 A 7/1995 Kawanishi et al.
6,104,343 A 8/2000 Brookner et al.
6,215,458 B1 * 4/2001 Aguttes et al. ............. 343/915
6,333,712 B1 * 12/2001 Haugse et al. .............. 342/375

FOREIGN PATENT DOCUMENTS

WO WO 00 72462 A 11/2000

OTHER PUBLICATIONS

"Beam–Shape Correcton in Deployable Phased Arrays" IEEE Transactions on Antennas and Propagation, IEEE, Inc., vol. 47, No. 3, Mar. 1999, pp. 482–486.

* cited by examiner

*Primary Examiner*—Theodore M. Blum
(74) *Attorney, Agent, or Firm*—Sughrue Mion, PLLC

(57) ABSTRACT

The invention relates to a beam forming network of an active antenna with deployable sub-arrays. According to the invention, the network receives information on deformation of the relative position of two panels. Establishing the coherence of the signals takes account of this information to restore the received signals. The invention also provides a spacecraft including the above kind of network and further provides a beam forming method. The invention also provides a system including a craft of the above kind and at least one beacon transmitter station.

18 Claims, 6 Drawing Sheets

BEAM FORMING NETWORK, A SPACECRAFT, AN ASSOCIATED SYSTEM AND A BEAM FORMING METHOD

The invention relates to an antenna on board a spacecraft, such as a geosynchronous satellite, adapted to receive and/or transmit radio frequency signals such as radio communication signals or radar signals.

BACKGROUND OF THE INVENTION

A geosynchronous satellite comprising a transmit antenna and a receive antenna, each of which has a reflector associated with a multiplicity of radiating elements, also known as sources, is used to provide communications over an extended territory, for example a territory the size of North America. To enable re-use of communication resources, especially frequency sub-bands, the territory to be covered is divided into areas and resources are allocated in such a way that adjacent areas are allocated different resources.

Each area, which has a diameter of the order of several hundred kilometers, for example, is of such a size that it must be covered by a plurality of radiating elements, in order to provide a high gain and so that the radiation from the antenna is sufficiently homogeneous over the area.

FIG. 1 shows a territory 10' covered by an antenna on board a geosynchronous satellite and n areas $12'_1$, $12'_2$, . . . , $12'_n$. In this example, four frequency sub-bands f1, f2, f3, f4 are used.

The area $12'_i$ is divided into a plurality of sub-areas $14'_1$, $14'_2$, etc., each of which corresponds to one radiating element of the antenna. FIG. 1 shows that some radiating elements, for example the element $14'_3$ at the center of the area $12'_i$, correspond to only one frequency sub-band f4, whereas others, for example those at the periphery of the area $12'_i$, are associated with a plurality of sub-bands (the sub-bands allocated to the adjacent areas).

FIG. 2 shows a prior art receive antenna for the above kind of telecommunication system.

The antenna has a reflector 20 and a plurality of radiating elements $22_1$, . . . , $22_N$ in the vicinity of the focal plane of the reflector. The signal received by each radiating element, for example the signal coming from the element $22_N$, passes first through a filter $24_N$ for eliminating the transmit frequency (which is at a high power) followed by a low-noise amplifier $26_N$. At the output of the low-noise amplifier $26_N$, a divider $30_N$ divides the signal into a plurality of portions, possibly with coefficients that can differ from one portion to another; the object of this division is to enable a radiating element to contribute to the formation of a plurality of beams. Thus an output $32_1$ of the divider $30_N$ is allocated to an area $34_p$ and another output $32_i$ of the divider $30_N$ is allocated to another area $34_q$.

The dividers $30_1$, . . . , $30_N$ and the adders $34_p$, . . . , $34_q$ for constituting the areas are part of a system 40 as a beam forming network (BFN).

In the beam forming network 40 shown in FIG. 2, each output of each divider $30_i$ is provided with a combination of a phase-shifter 42 and an attenuator 44. The phase-shifters 42 and the attenuators 44 modify the radiation diagram, either to correct it if the satellite has suffered an unwanted displacement or to modify the distribution of the terrestrial areas.

Each low-noise amplifier $26_N$ is associated with another low-noise amplifier $26'_N$ which is identical to it and whose function is to replace the amplifier $26_N$ should it fail. To this end, two switches $46_N$ and $48_N$ are provided to enable such replacement. It is therefore necessary to provide telemetry means (not shown) for detecting such failure and telecontrol means (also not shown) to effect such replacement.

For existing satellite "mobile" services (for example satellite mobile telephony services) to grow without competition from terrestrial networks, it is necessary for the terminals used for these services to have the same overall size as those used for terrestrial networks. The only parameter of the link balance that is still open to modification in order to reduce terminal size and power is the figure of merit of the satellite, in the uplink direction, and the equivalent isotropically radiated power (EIRP) transmitted by the antenna of the satellite, in the downlink direction. To increase the EIRP of the satellite, it is possible to find a compromise between the size of the antenna and the power of the satellite amplifiers. However, a compromise is not possible for the figure of merit, because the noise temperature is fixed by natural constraints. Improving the figure of merit must therefore be achieved by increasing the size of the antenna.

A large antenna, i.e. an antenna having a large surface area for picking up or radiating electromagnetic signals, has the benefit of a high gain (its gain is proportional to its surface area) and a corresponding resolution (its resolution is proportional to its largest dimension). The great majority of space applications, such as radio communications, eavesdropping, and electromagnetic remote sensing, require the use on board spacecraft of antennas with a very high gain and a very high resolution. This is why, at present, space applications use antennas with a very large reflector (having a diameter of the order of 12 to 15 meters).

However, producing antennas with a diameter greater than 15 meters gives rise to numerous technical and practical problems, in particular stowage in the nose-cone of the launch vehicle, deployment from the spacecraft in orbit, and various mechanical and electrical constraints associated with objects in zero gravity and a vacuum, such as structural stiffness, mechanical strength, mechanical vibration, expansion and contraction.

One solution to these problems is to use "active" antennas with arrays of deployable radiating elements.

One such antenna, described in U.S. Pat. No. 5,430,451, is an array antenna for spacecraft including a plurality of sub-arrays connected together by a mechanism with joints. In this way, the antenna can occupy a folded configuration (referred to as the stacked configuration) during launch of the spacecraft and a flat, unfolded configuration (referred to as the unstacked configuration) after the spacecraft is launched.

However, establishing coherence of the signals from the sub-arrays does not take account of mechanical deformation relative to each other of the panels supporting the sub-arrays.

OBJECTS AND SUMMARY OF THE INVENTION

An object of the present invention is to eliminate the drawbacks previously cited. The invention has the particular object of providing a simple way to obtain a wide active array antenna comprising a plurality of deployable sub-arrays of radiating elements.

To this end, the invention provides a beam forming network adapted to cooperate with an active array antenna of a spacecraft, the antenna including:

a plurality of sub-arrays of radiating elements, and a plurality of support panels for supporting respective sub-arrays, which panels are able to move from a folded configuration in which the panels at least partially overlap to a deployed configuration in which the panels are substantially coplanar, said beam forming network including means for establishing the coherence of respective signals received by the plurality of sub-arrays by weighted summation of said signals as a function of the expected angle of incidence (θ) on the sub-arrays of the respective signals and the expected relative phase-shifts due to signal propagation time-delays between the sub-arrays, and said beam forming network further comprising means for estimating information representative of a deformation (α) of the relative positions of the panels compared to an expected predetermined configuration, and said summation of said signals is also effected as a function of said information representative of deformation.

Establishing coherence of the signals received by the sub-arrays entails weighted summation of the signals. The weighting applied to each signal is calculated as a function of the required angle of incidence of the signal on the sub-array, the real (or observed) angle of incidence of the signal on the sub-array, and the phase-shifts due to relative signal propagation time-delays caused by the relative positions of the sub-arrays and the distances between them.

Coherent summation of the payload signals uses information on the relative geometry of the panels.

Using a plurality of sub-arrays of radiating elements and associated support panels has the advantage of a stackable structure that can be accommodated within a volume compatible with that of a launch vehicle nose-cone.

Deploying the stacked structure does not necessitate any complex opening-closing mechanism. For example, opening and closing can be effected in the conventional manner used for solar panels. The support panels do not require any mechanical stiffness in their connection to the spacecraft. Furthermore, the absence of a locking system and the freedom of movement (possibility of oscillation) between adjacent panels reduces the mechanical stresses on the spacecraft.

In one embodiment of the invention, the beam forming network according to the invention includes digital signal processing means.

In one embodiment of the invention, the digital signal processing means include computation software.

In one embodiment of the invention, because said radiating elements are adapted to be employed for receiving and transmitting signals alternately or simultaneously, each radiating element of the panels is connected to respective phase-shifter means adapted to modify the phase of the wave to be transmitted, and the beam forming network includes respective control means for controlling said phase-shifter means so that said deformation is compensated by the modification of the phase of the respective radiating elements of the panels in deformed positions.

The invention also provides a system for receiving radio frequency signals comprising a radio frequency antenna for spacecraft and a beam forming network, the antenna comprising:

a plurality of sub-arrays of radiating elements, and a plurality of support panels for supporting respective sub-arrays, which panels are able to move from a folded configuration in which the panels overlap at least partly to a deployed configuration in which the panels are substantially coplanar, and the beam forming network including means for establishing the coherence of respective signals received by the plurality of sub-arrays by weighted summation of said signals as a function of the required angle of incidence of the respective signals on the sub-arrays, the actual angle of incidence of the signal on each sub-array, and the relative phase-shifts due to signal propagation delays, wherein said beam forming network is a network according to the invention.

In one embodiment of the invention said plurality of panels comprises first and second series of panels for receiving and transmitting radio frequency signals, said system includes a multiple-source transmitter system adapted to transmit the transmit signals toward the second series of panels, which include radiating elements corresponding to each source, each corresponding radiating element being adapted to receive a specific signal intended to be phase-shifted by said phase-shifter means as a function of the deformation information received by the network, and the signal, phase-shifted in the above manner where applicable, is transmitted to the respective radiating element of the first series of panels for radio transmission.

In one embodiment of the invention, the analog means for processing the receive and transmit radio frequency signals are on the panels.

In one embodiment of the invention, said analog processing means are connected to the beam forming network by at least one optical fiber.

The invention further provides a spacecraft including a system in accordance with the invention for receiving radio frequency signals.

The invention further provides a beam forming method for use in a beam forming network adapted to cooperate with a radio frequency antenna on board a spacecraft, said antenna comprising:

a plurality of sub-arrays of radiating elements, a plurality of support panels for supporting respective sub-arrays, the panels being able to move from a folded configuration of the antenna in which the panels at least partly overlap to a deployed configuration in which the panels are substantially coplanar, said method including a step of establishing the coherence of respective signals received by the plurality of sub-arrays by weighted summation of said signals as a function of the expected angle of incidence on the sub-arrays of the respective signals and expected relative phase-shifts due to signal propagation delays, which method further includes, before the step of establishing coherence, a step of estimating information representative of a deformation of the relative positions of the panels relative to an expected predetermined configuration, and said summation of said signals is also effected as a function of said information representative of deformation.

In one embodiment, said information representative of deformation comprises the angle between said two adjacent panels, said angle being used for the summation.

In one embodiment of the invention, said method includes a step of a remote beacon signal transmitter whose location is known transmitting a beacon signal to enable estimation of said information representative of a deformation relative to said expected predetermined configuration.

The invention further provides a system comprising:

a spacecraft according to the invention, and at least one remote beacon signal transmitter whose location is known to said spacecraft to enable estimation of said information representative of a deformation relative to said expected predetermined configuration.

BRIEF DESCRIPTION OF THE DRAWINGS

Other features and advantages of the invention will emerge from the description of embodiments of the invention given with reference to the accompanying drawings, in which.

MORE DETAILED DESCRIPTION

In the remainder of the description, components with similar functions may carry the same reference numbers in different figures.

Figure 1:
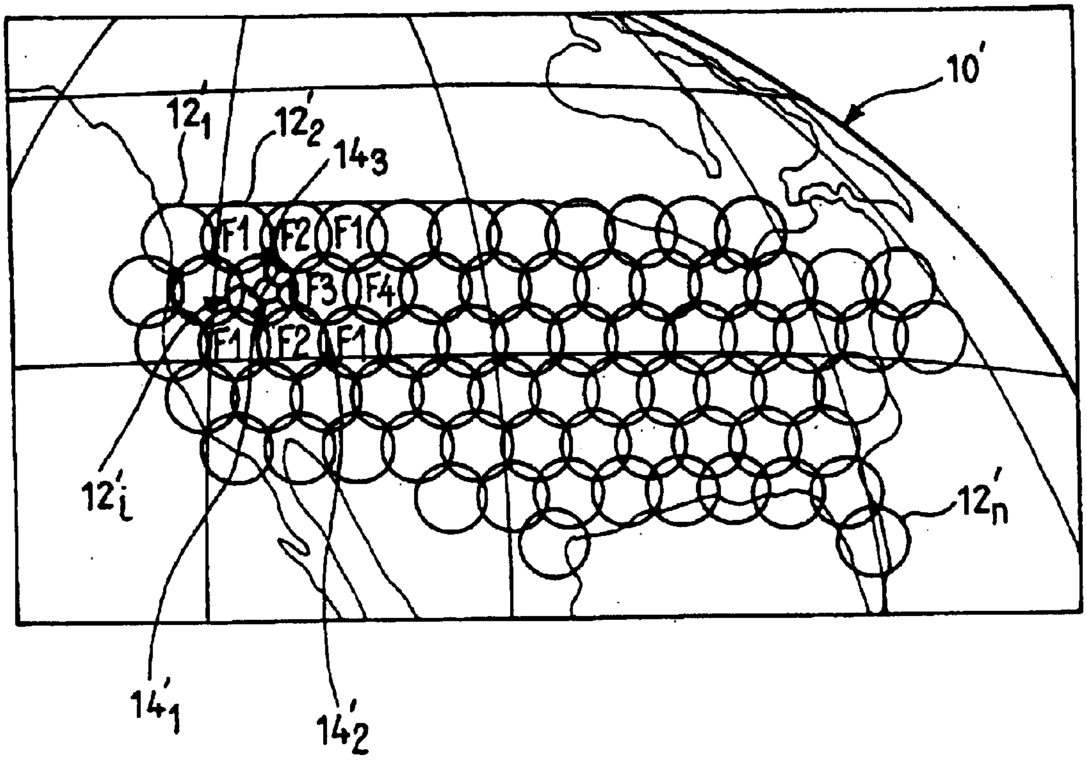
FIG. 1, already described, shows a territory which is divided into areas and covered by an antenna on board a geosynchronous satellite, FIG. 2, already described, shows diagrammatically a prior art receive antenna.
Figure 2:
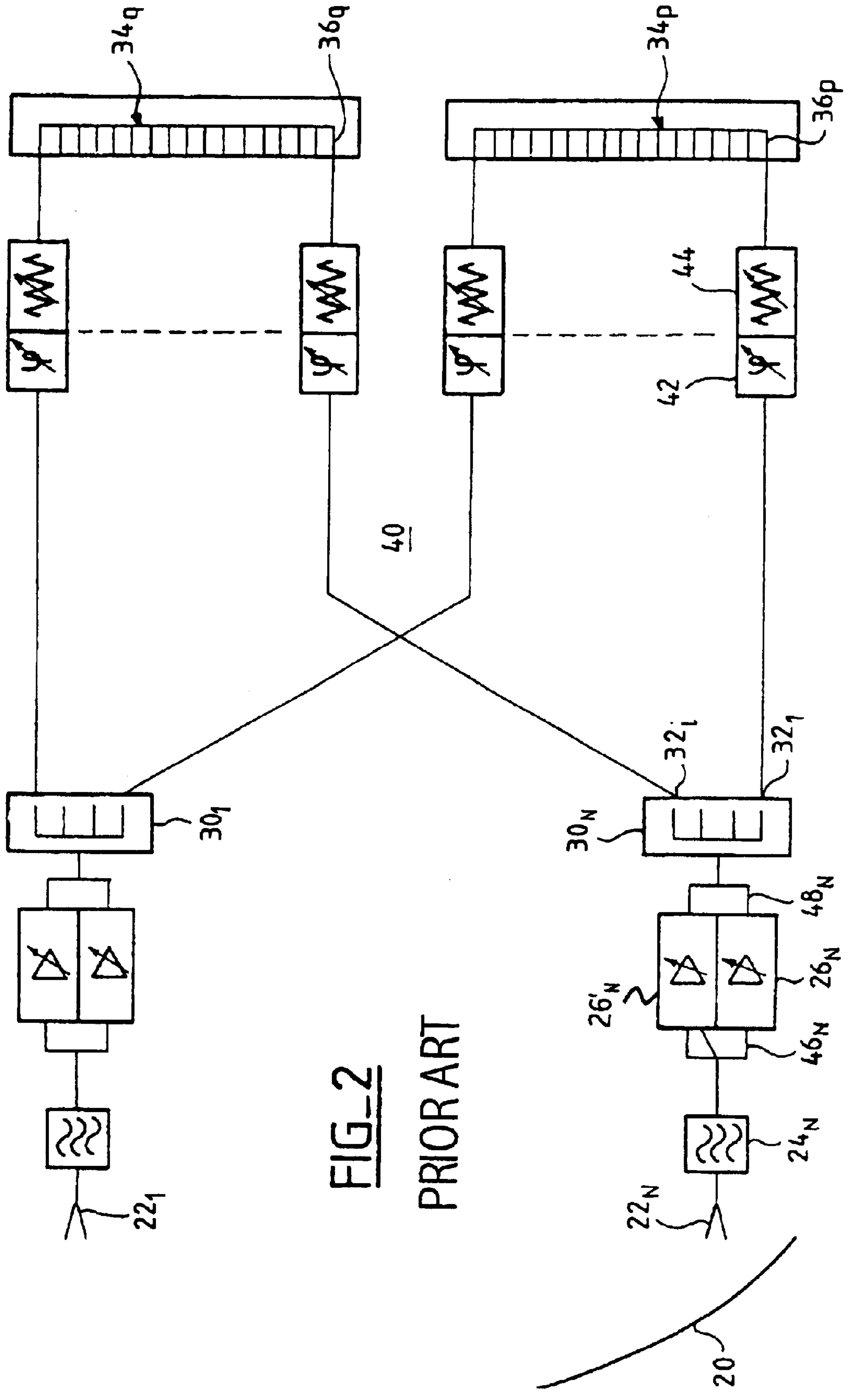
FIG 2 PRIOR ART
Figure 3:
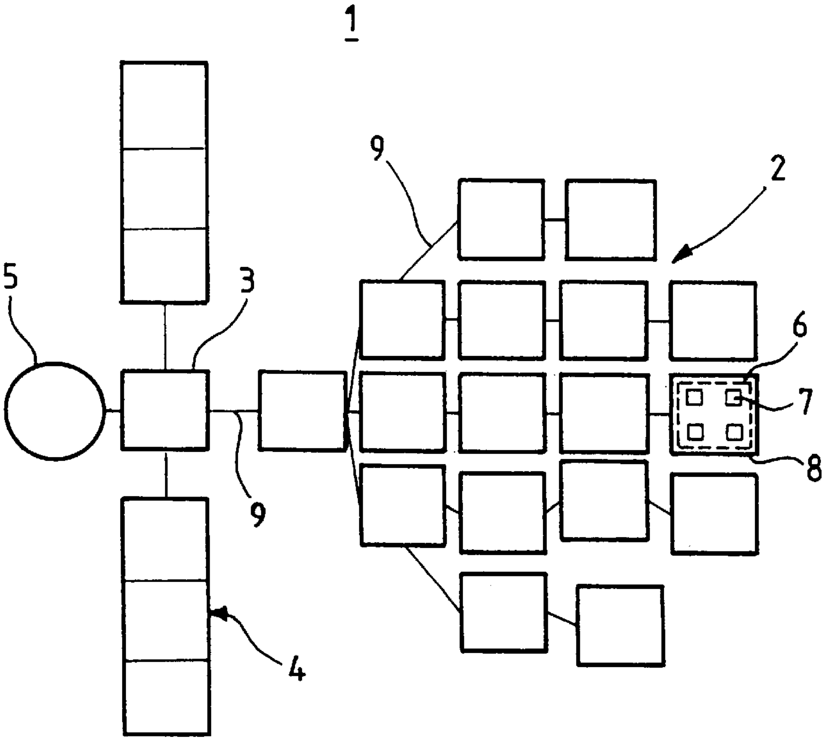
FIG. 3 shows a telecommunication satellite with an array antenna conforming to a first embodiment of the invention in a deployed configuration.

FIG. 3 shows a telecommunication satellite 1 with an array antenna 2 conforming to a first embodiment of the invention in a deployed configuration.

Two solar generator panels 4 for converting solar energy into electrical energy are attached to the body 3 of the satellite. The panels 4 are shown in a deployed configuration in FIG. 3. The receive antenna 2 and a transmit antenna 5 are provided on respective opposite sides of the body 3 of the satellite. In this embodiment of the invention, the transmit antenna is of standard design and does not make use of the invention. The power amplifiers and other components for the transmit part can be accommodated wholly or partly on the body of the satellite, thanks to the saving achieved by the invention in terms of the overall size of the satellite body on the receiving part side.

The array antenna 2 comprises a plurality of plane panels 8 disposed in the vicinity of the body of the satellite. The panels support sub-arrays 6 of radiating elements 7, each of which has a polarizer, the polarizer for one of the sub-arrays being shown diagrammatically in FIG. 3. The panels are not necessarily interconnected by a mechanism with fixed joints. The connections between the panels and the connections connecting some of the panels 8 to the body of the satellite can be provided by cables 9. Each sub-array 6 is analogous to a direct radiating array (DRA).

Figure 4:
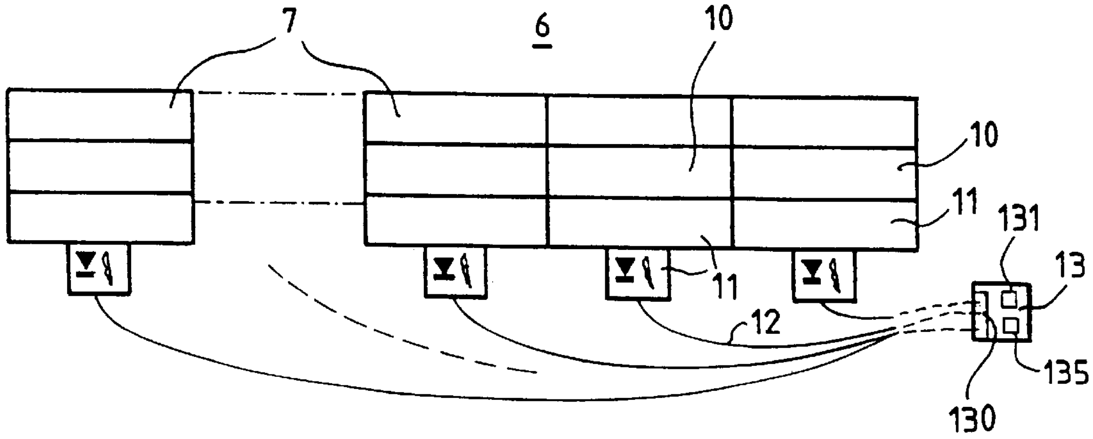
FIG. 4 shows the component parts of a sub-array of one embodiment of a panel according to the invention.

FIG. 4 shows in section the components of a sub-array 6 of a panel 8 conforming to one embodiment of the invention. The signals arriving at the sub-array 6 of a panel are received by the radiating elements 7 of the sub-array. The received signal on each radiating element channel is first filtered by a filter and low-noise amplifier (LNA) unit 10 adapted to filter and amplify only the portion of the received signal centered on the required frequency, and in particular to eliminate the transmit frequency. The resulting filtered signal on each channel is then supplied at the output of the filter and amplifier unit to a sampling unit 11 for sampling the modulation of the received microwave signal. In this embodiment of the invention, the sampling unit is an optical unit and delivers the samples on an optical fiber 12. Electrical cables, not shown, supply electrical power to the amplifiers 10 and the sampling units 11.

Each optical fiber 12 of each panel is connected to receive inputs 130 of a digital processor 13 known as a beam forming network (BFN). The function of the network 13 is to ensure that the whole of the surface of the sub-arrays is used for optimum pick-up of radio frequency energy transmitted by terrestrial terminals (see below). This is achieved in particular by establishing the coherence of and summing all the payload signals received from all the optical fibers corresponding to the various receive channels.

Note that summation is coherent in the case of the payload signals, employing the principle of the invention of using information on the relative geometry of the panels, and incoherent in the case of thermal noise and other unwanted signals, which may or may not have the same angle of incidence as the payload signals.

Note also that all of the analog signal processing part is on the panels and that the array 13 performs digital signal processing. For example, the network 13 is a microcontroller and coherence is established by known means, which can be a portion 131 of the software.

The principle of the invention is based on the fact that the direction of arrival of the wavefront corresponding to a wave emitted by a terrestrial terminal and arriving at the panels 8 is not the same for each of the panels if their relative positions fluctuate over time. To form beams by a process of computation, it is therefore necessary for the beam forming network 13 to take account of the relative position of each panel for each sample when summing the signals from the various radiating elements. The time-delay or phase-shift to be compensated in the digital signal processing corresponding to a given radiating element must then be based on the conjugation of the following parameters: the angle of incidence of the signal, the distance of the given radiating element from the others, and the angle between the given radiating element and the other receive radiating elements. Of course, since the panels supporting the radiating elements are parallel to them, it amounts to the same thing to refer to the angles between the various panels.

Figure 5:
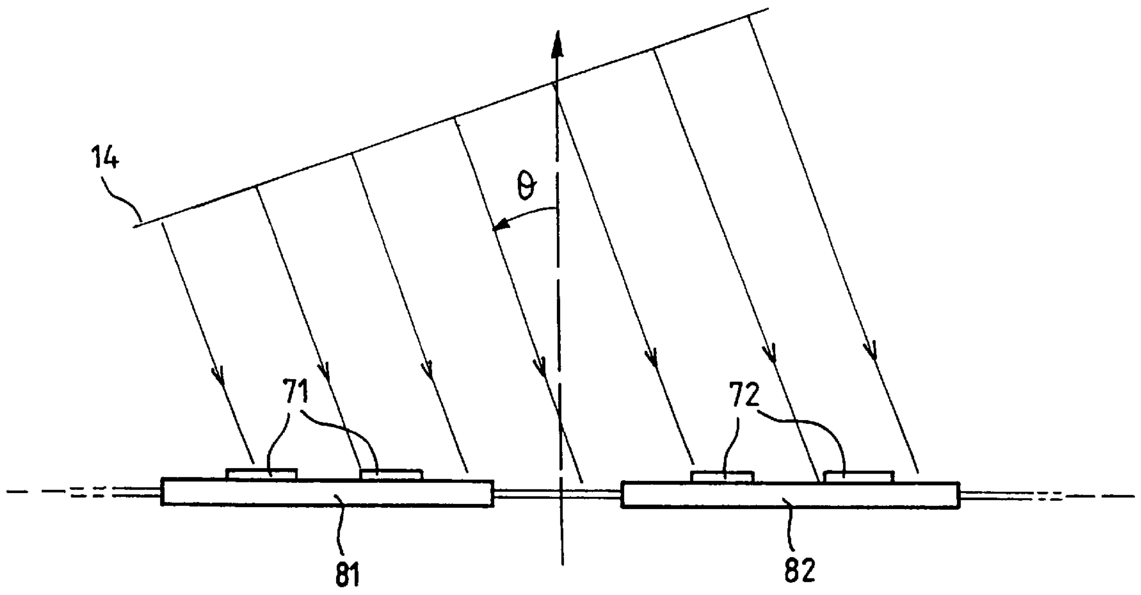
FIG. 5 shows diagrammatically in section two radiating elements support panels when the latter are coplanar.

FIG. 5 shows diagrammatically two panels 81, 82 supporting respective radiating elements 71, 72 and interconnected by a cable 9; this example is simplified to two dimensions to make the explanation clearer. In this figure, the panels and their radiating elements are coplanar and the wavefront 14 impinges on the radiating elements at an angle $\theta$ to the normal to the panels; this applies to both panels. In this configuration, the phase law used in the beam forming network 13 is adapted to concentrate the radiated energy in the direction $\theta$.

Figure 6:
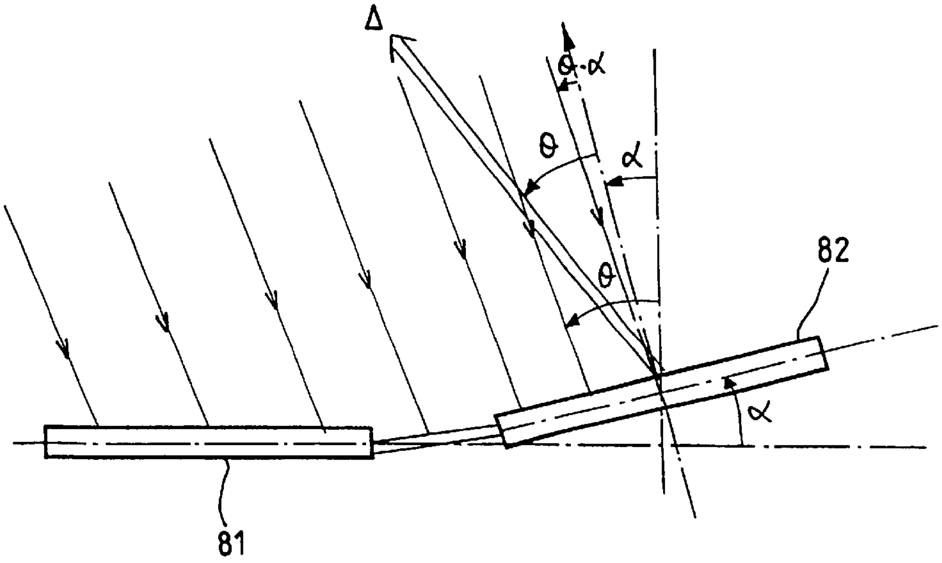
FIG. 6 shows diagrammatically in section the same two panels when the plane of one of them has been deviated relative to the plane of the other.

In FIG. 6, on the other hand, following mechanical deformation with various causes (centrifugal force, etc.), the plane of the panel 82 has been deviated by an angle $\alpha$ relative to the plane of the panel 81. As can be seen in FIG. 6, taking account of the same angle of incidence $\theta$ as in FIG. 5 and the angle of deviation $\alpha$ of the panel 82 relative to the panel 81, the phase law for the radiating elements 72 of the panel 81 is then adapted to maximize the radiation of energy in the direction $\Delta$ at an angle $\theta+\alpha$ to the normal to the plane of the panel 81. In this configuration, to remedy the depointing problem referred to above, it is necessary to correct the process for establishing the coherence of the two signals from the radiating elements 71, 72 by introducing into the summation a weighting representative of the phase-shift $-\alpha$. This processing can be effected by computation software in the network 13 based on an estimate of said angle $\alpha$ by estimator means 135.

The angle $\alpha$ can be determined by regularly transmitting a predetermined beacon signal. The beacon signal is advantageously transmitted from a ground station and has a power such that each radiating element can receive it with a sufficient signal-noise ratio. As a result of this, the signal received by each radiating element can reach the network 13. Knowing the position of the ground station sending the beacon signal and the position and the attitude of the spacecraft, the array 13 knows the angle of incidence of the incoming signal and can deduce the value of the angle α using a simple pre-recorded geometrical calculation. This method has the advantage that it is self-adapting and is therefore able to track evolution of the relative geometry of the panels.

In the present embodiment, and as explained further hereinafter, the beacon signal is transmitted periodically by a ground station (not shown) to provide a value of the angle which is updated regularly. The beacon signal can come from somewhere else, of course, such as a transmitter on the satellite or on another satellite, or any other transmitted reference signal can be used, the principle being to have the benefit of a signal that can be detected by the network 13 as being a reference signal for measuring the angle α.

Figure 7:
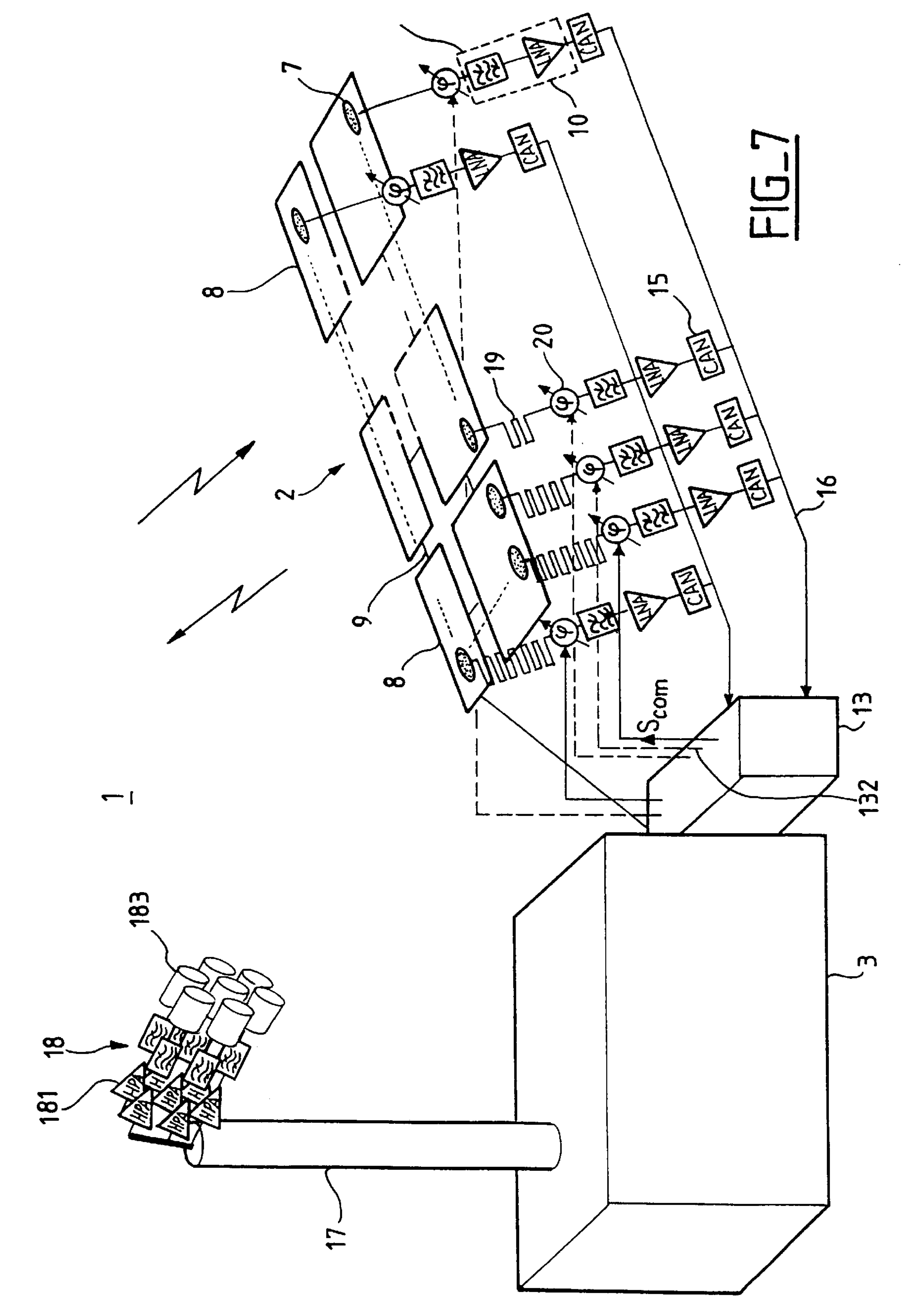
FIGS. 7 and 8 show variants of the telecommunication satellite 1 from FIG. 3 in which the principle of the invention of taking account of information on deformation of the panels is employed not only for reception but also for transmission.
Figure 8:
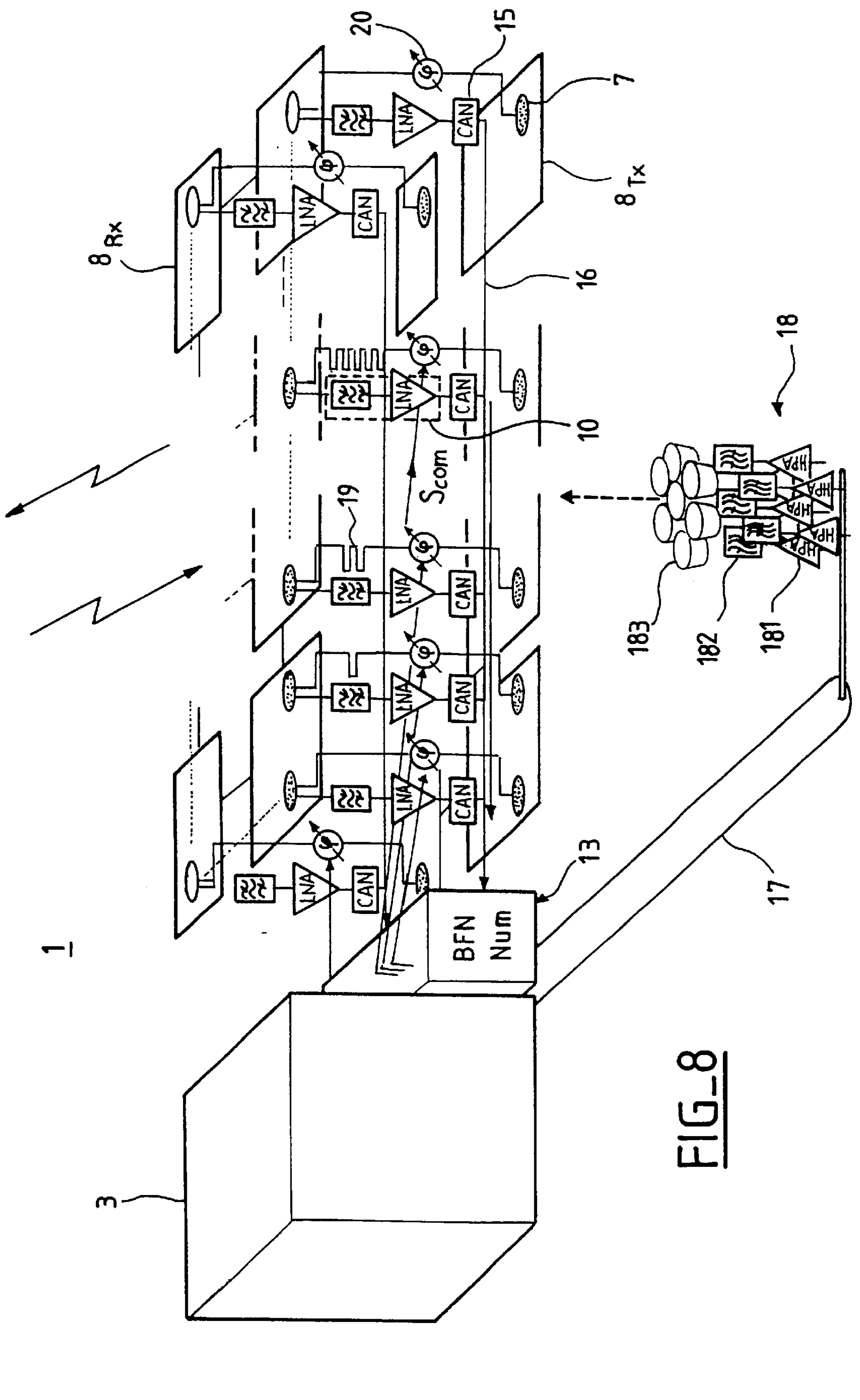

FIGS. 7 and 8 show variants of the telecommunication satellite 1 from FIG. 3, in which the principle of the invention of taking account of information on deformation of the panels is employed not only for reception but also for transmission. The principal advantage of the structure shown in FIGS. 7 and 8 is that it benefits from the self-correcting characteristics of the beam forming network 13 regardless of relative deformations to which the panels may be subjected.

For clarity, the analog part for processing transmit and receive signals is shown as divided up under the panels 8 in FIG. 7 and between the receive panels 8*rx* and the transmit panels 8*tx* in FIG. 8.

In FIGS. 7 and 8, the optical sampling unit from FIG. 4 is replaced by an analog-to-digital converter 15 electrically connected to the network 13 by a connection 16.

In addition to the analog receive part shown in FIG. 4, each radiating element is connected to a delay line 19 and to a variable phase-shifter 20 for processing the transmit signal.

The FIG. 7 embodiment includes a mast 17 connected to the body 3 of the satellite and carrying a multiple-source transmit system 18. This type of arrangement is known as reflector array.

The phase-shifter 20 connected to a radiating element receives a control signal from an output port 132 of the network 13 for controlling the phase-shift of the element on transmission. The phase-shifter is controlled to modify the phase of the wave to be transmitted, the modification being of the same order as the deviation of the panel supporting said radiating element (the angle α in the FIG. 6 example). The delay line 19 in series compensates the propagation delay between the multiple-source system 18 and the radiating element 7.

FIG. 8 shows a variant of the embodiment from the preceding figure, in which two series of deployed panels are used, with the first series oriented in the direction of the signal to be received from the terrestrial terminal and the second series facing the first series with the radiating elements on the side opposite that facing the first series. These radiating elements 8*tx* face the multiple-source transmit system 18 and are intended to receive the signals transmitted by the sources 183 of the system 18. This arrangement is known as a bootlace lens. The phase-shifter 20 connected to a radiating element receives a control signal from an output port 132 of the network 13 for controlling the phase-shift of the transmit element. The phase-shifter is controlled to modify the phase of the wave to be transmitted, the modification being of the same order as the deviation of the panel supporting said radiating element (the angle α in the FIG. 6 example).

The FIGS. 7 and 8 embodiments have the particular advantage of centralized transmit amplification, which enables traveling wave tubes to be used instead of SSPA, which improves transmit power efficiency. On the other hand, the series of panels supporting the panels 8*tx* does not include any transmit power amplifier units, which is beneficial from the point of view of panel heat control, and these panels can therefore be regarded as "cold" panels. Nevertheless, an embodiment (not shown) using power amplifiers on the panels for transmission has other advantages.

Note that the FIG. 8 embodiment is more rugged in terms of deformation, as a front path is compensated by a rear path.

Of course, the invention is not limited to the embodiments described above.

Thus the optical fibers 12 used to connect the analog signal processing part to the beam forming network 13 can be replaced by any other electrical connection means. Optical fiber has the advantage of reducing the overall size of the connections.

Any type of deployment can be used for opening/closing the support panels.

What is claimed is:

1. A beam forming network adapted to cooperate with an active multiple-zone array antenna of a spacecraft, the antenna including:

a plurality of sub-arrays of radiating elements, and a plurality of support panels for supporting respective sub-arrays, which panels are able to move from a folded configuration in which the panels at least partially overlap to a deployed configuration in which the panels are substantially coplanar, said beam forming network including means for establishing the coherence of respective signals received by the plurality of sub-arrays by weighted summation of said signals as a function of the expected angle of incidence on the sub-arrays of the respective signals and the expected relative phase-shifts due to signal propagation time-delays between the sub-arrays, and said beam forming network further comprising means for estimating information representative of a deformation of the relative positions of the panels compared to an expected predetermined configuration, and said summation of said signals also being effected as a function of said information representative of deformation.

2. A beam forming network according to claim 1, including digital signal processing means.

3. A beam forming network according to claim 2, wherein the digital signal processing means includes computation software.

4. A beam forming network according to claim 1, wherein, because said radiating elements are adapted to be employed for receiving and transmitting signals alternately or simultaneously, each radiating element of the panels is connected to respective phase-shifter means adapted to modify the phase of the wave to be transmitted, and wherein the beam forming network includes respective control means for controlling said phase-shifter means so that said deformation is compensated by the modification of the phase of the respective radiating elements of the panels in deformed positions.

5. A system for receiving radio frequency signals comprising a multiple-zone radio frequency antenna for spacecraft and a beam forming network, the antenna comprising:

a plurality of sub-arrays of radiating elements, and a plurality of support panels for supporting respective sub-arrays, which panels are able to move from a folded configuration in which the panels overlap at least partly to a deployed configuration in which the panels are substantially coplanar, and the beam forming network including means for establishing the coherence of respective signals received by the plurality of sub-arrays by weighted summation of said signals as a function of the required angle of incidence of the respective signals on the sub-arrays, the actual angle of incidence of the signal on each sub-array, and the relative phase-shifts due to signal propagation delays, wherein said beam forming network is a network according to claim 1.

6. A receiver system according to claim 5, wherein said plurality of panels comprises first and second series of panels for receiving and transmitting radio frequency signals, wherein said system includes a multiple-source transmitter system adapted to transmit the transmit signals toward the second series of panels, which include radiating elements corresponding to each source, each corresponding radiating element being adapted to receive a specific signal intended to be phase-shifted by said phase-shifter means as a function of the deformation information received by the network, and wherein the signal, where applicable phase-shifted in the above manner, is transmitted to the respective radiating element of the first series of panels for radio transmission.

7. A receiver system according to claim 5, wherein the analog means for processing receive and transmit radio frequency signals are on the panels.

8. A receive system according to claim 7, wherein said analog processing means are connected to the beam forming network by at least one optical fiber.

9. A spacecraft including a system according to claim 5 for receiving radio frequency signals.

10. A beam forming network according to claim 1, wherein each of said plurality of sub-arrays comprises a polarizer.

11. A beam forming network according to claim 1, wherein said plurality of support panels are interconnected by cables.

12. A beam forming network according to claim 1, further comprising a filter and a low noise amplifier wherein said filter and said low noise amplifier filter and amplify a portion of the signals received by the plurality of sub-arrays centered on a required frequency.

13. A beam forming network according to claim 12, further comprising:

a sampling unit, wherein said sampling unit samples a modulation of said signals received by the plurality of sub-arrays, wherein said sampling unit comprises an optical unit, and wherein said sampling unit delivers said modulation samples of said signals received by the plurality of sub-arrays, on a plurality of optical fibers to a receive input of a digital processor.

14. A beam forming network according to claim 1, wherein said time-delays and/or said phase shifts are determined according to the angle of incidence of said signals received by the plurality of sub-arrays, the distance of a radiating element on one of said plurality of support panels to a radiating element on a different one of said plurality of support panels, and an angle between the radiating element on one of said plurality of support panels to a radiating element on a different one of said plurality of support panels.

15. A beam forming method for use in a beam forming network adapted to cooperate with a multiple-zone radio frequency antenna on board a spacecraft, said antenna comprising:

a plurality of sub-arrays of radiating elements, a plurality of support panels for supporting respective sub-arrays, the panels being able to move from a folded configuration of the antenna in which the panels at least partly overlap to a deployed configuration in which the panels are substantially coplanar, said method including a step of establishing the coherence of respective signals received by the plurality of sub-arrays by weighted summation of said signals as a function of the expected angle of incidence on the sub-arrays of the respective signals and expected relative phase-shifts due to signal propagation delays, which method further includes, before the step of establishing coherence, a step of estimating information representative of a deformation of the relative positions of the panels relative to an expected predetermined configuration, and said summation of said signals is also effected as a function of said information representative of deformation.

16. A beam forming method according to claim 15, wherein said information representative of deformation includes the angle between said adjacent panels, said angle being used for the summation.

17. A beam forming method according to claim 15, including a step of a remote beacon signal transmitter whose location is known transmitting a beacon signal to enable estimation of said information representative of a deformation relative to said expected predetermined configuration.

18. A system comprising:

a spacecraft according to claim 15, and at least one remote beacon signal transmitter whose location is known to said spacecraft to enable estimation of said information representative of a deformation relative to said expected predetermined configuration.

* * * * *